United States Patent [19]
Robin et al.

[11] Patent Number: 5,134,679
[45] Date of Patent: Jul. 28, 1992

[54] CONNECTOR FOR COUPLING AN OPTICAL FIBER ON A BACKPLANE TO A COMPONENT ON A CIRCUIT BOARD

[75] Inventors: Max S. Robin, Denville, N.J.; David A. Snyder, Springfield Township, Bucks County, Pa.; Roger E. Weiss, Denville, N.J.

[73] Assignee: AT&T Bell Laboratories, Murray Hill, N.J.

[21] Appl. No.: 702,543

[22] Filed: May 20, 1991

[51] Int. Cl.⁵ .............................................. G02B 6/36
[52] U.S. Cl. ...................................... 385/90; 385/79; 385/88
[58] Field of Search ............... 350/96.20, 96.21, 96.22; 385/49, 78, 79, 80, 88, 89, 90, 91, 92, 93

[56] References Cited

U.S. PATENT DOCUMENTS

| | | | |
|---|---|---|---|
| 4,217,030 | 8/1980 | Howarth | 350/96.21 |
| 4,406,514 | 9/1983 | Hillegonds et al. | 350/96.21 |
| 4,461,537 | 7/1984 | Raymer, II et al. | 350/96.20 |
| 4,798,440 | 1/1989 | Hoffer et al. | 350/96.20 |
| 4,807,955 | 2/1989 | Ashman et al. | 350/96.20 |
| 4,895,424 | 1/1990 | Hughes | 350/96.20 |
| 4,944,568 | 7/1990 | Danbach et al. | 350/96.20 |

OTHER PUBLICATIONS

*Proceedings of the 9th International Electronics Packaging Conference,* vol. 2, Sep. 1989, "A Family of Connectors for Circuit Pack to Backplane Optical Interconnection" by R. E. Weiss, pp. 1033–1042.

*Primary Examiner*—John D. Lee
*Attorney, Agent, or Firm*—Lester H. Birnbaum

[57] ABSTRACT

Disclosed is a connector which permits optical connections between a circuit pack and backplane. The optical components are mounted on a major surface of a circuit pack near the edge. Optical fibers are mounted within a housing which is secured to the backplane. The use of springs within the housing gives sufficient tolerances so that the fibers are aligned with the components when the circuit pack is inserted within a shelf.

6 Claims, 4 Drawing Sheets

CONNECTOR FOR COUPLING AN OPTICAL FIBER ON A BACKPLANE TO A COMPONENT ON A CIRCUIT BOARD

BACKGROUND OF THE INVENTION

This invention relates to optical interconnections and, in particular, to a means for connecting optical components on a circuit board to optical fibers mounted in a backplane.

Large scale interconnection of elements on circuit packs is typically done by inserting the packs in shelves so that the edge of the circuit pack, which includes appropriate connectors thereon, makes electrical contact with a backplane at the far end of the shelves. In present and future systems, the need is increasing for providing optical, as well as electrical, interconnection of these circuit packs.

At the present time, the optical component is usually mounted somewhere on the interior of the board surface with optical fibers coupled thereto. The fibers are then interconnected through the backplane by means of a connector coupled to the edge of the circuit pack adjacent to the electrical connector (see, e.g., R. E. Weiss, "A Family of Connectors for Circuit Pack to Backplane Optical Interconnection," *Proceedings of the 9th International Electronics Packaging Conference*, Vol. 2, pp. 1033-1042, September 1989). Such systems should be more economical to manufacture if the fiber routing over the circuit pack were eliminated.

Prior proposals have been made for connecting optical fibers to components mounted on printed circuit boards (see for example, U.S. Pat. No. 4,461,537 issued to Raymer, and U.S. Pat. No. 4,798,440 issued to Hoffer). However, it does not appear that workers in the art previously have addressed the problems of connecting fibers through a backplane to an optical component mounted on a circuit pack so that the connection is made when the circuit pack is positioned within its shelf.

SUMMARY OF THE INVENTION

The invention, in accordance with one aspect, is an optical fiber connector comprising a first sleeve for holding the fiber, and a housing with an entrance port for receiving the sleeve and an exit port. A barrel member with a second sleeve for receiving the first sleeve is slidably mounted within the housing and extends through the exit port. Spring means are provided between a portion of the first sleeve and the barrel member for permitting axial movement of the first sleeve. Means are also provided for movably mounting the housing to a backplane.

BRIEF DESCRIPTION OF THE DRAWING

These and other features of the invention are delineated in detail in the following description. In the drawing.

It will be appreciated that, for purposes of illustration, these FIGURES are not necessarily drawn to scale.

DETAILED DESCRIPTION

Figure 1:
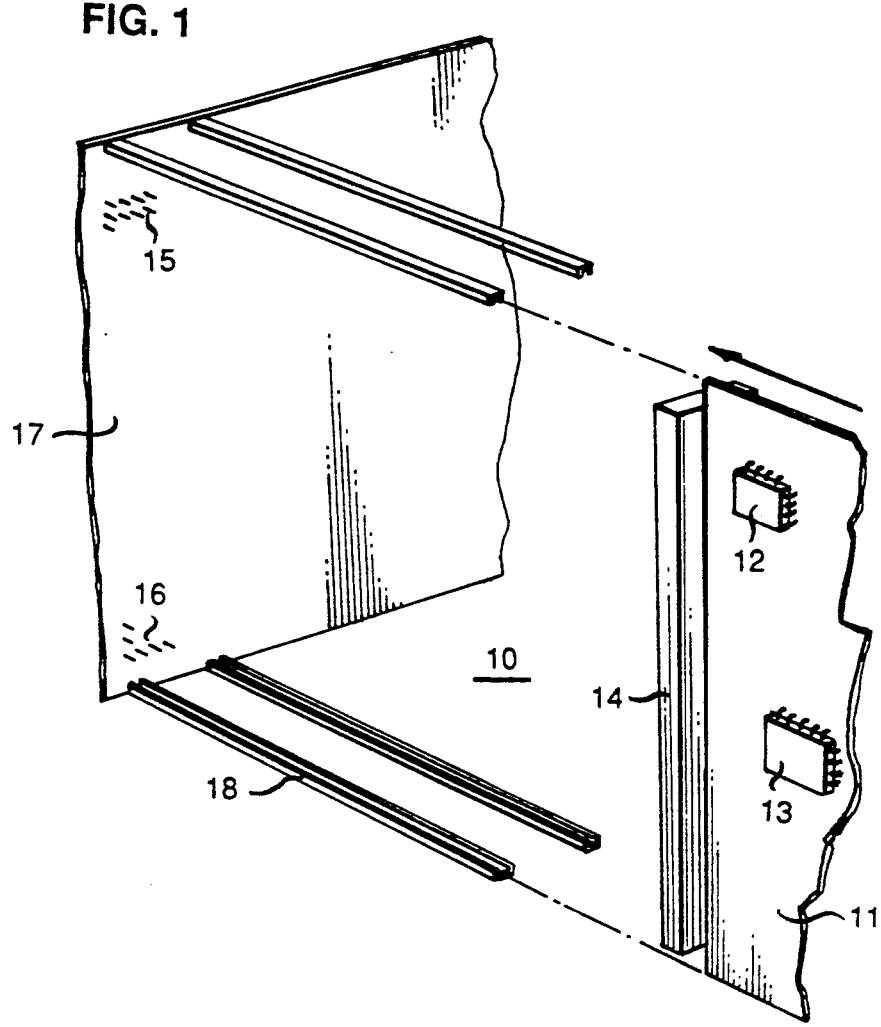
FIG. 1 is a perspective view of a typical backplane and circuit pack configuration which can make use of the invention.
Figure 5:
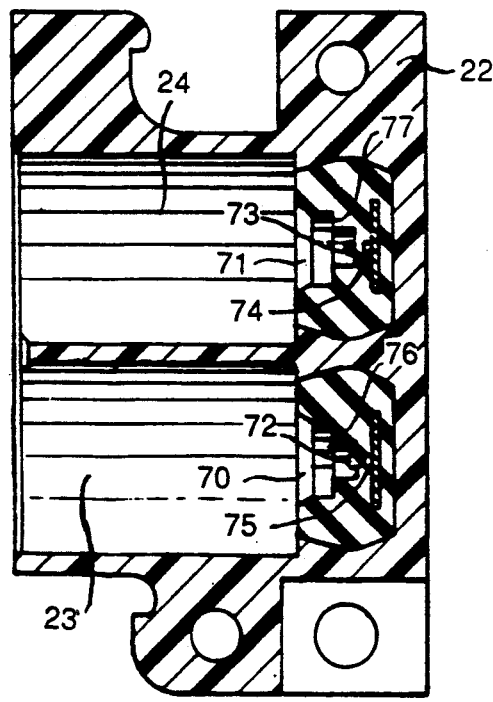
FIG. 5 is an enlarged cross-sectional view of a portion of the connector of FIG. 3.
Figure 2:
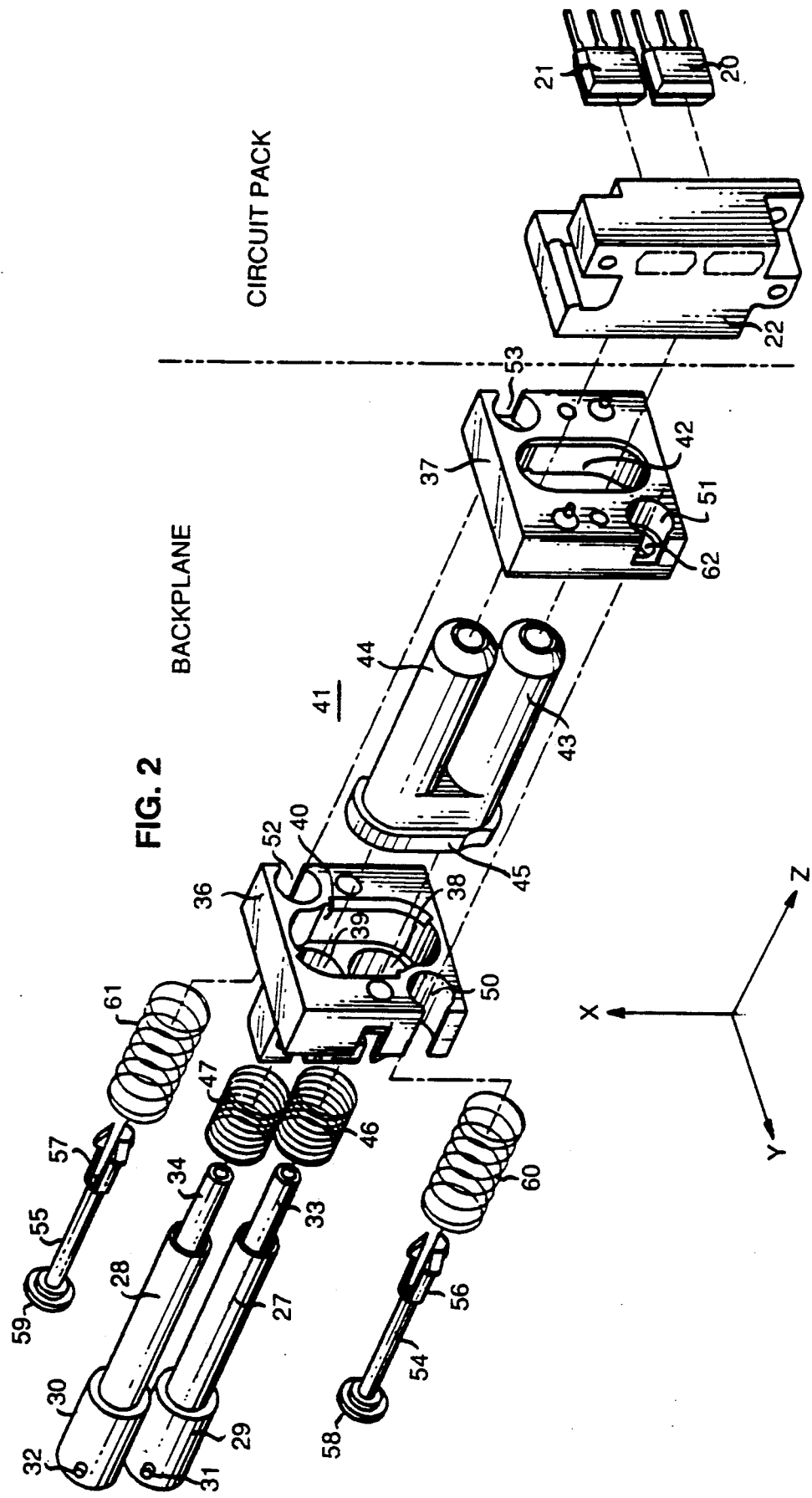
FIG. 2 is an exploded perspective view of a connector in accordance with an embodiment of the invention.

FIG. 1 illustrates in a perspective view a fairly typical interconnection system which could benefit from the present invention. A circuit pack, 10, includes a printed circuit board, 11, which has a plurality of electronic components, such as 12 and 13, bonded thereto. An electrical connector, 14, is bonded to one edge of the circuit board. The connector is electrically coupled to conductive lands (not shown) on the board. One surface of the connector includes a plurality of sockets designed to receive conductive pins such as 15 and 16 mounted in a backplane 17. Thus, the circuit pack, 10, is inserted into a shelf, 18, which guides the circuit pack to a position where electrical contact is made between the pins on the backplane and the connector 14 on the circuit pack. Once the circuit pack is in position, it is kept in place by a suitable latch (not shown).

It is desirable in many systems to include an optical, as well as electrical, interconnection between the circuit pack and backplane. Such a connection would have to be made as the circuit pack was slid into position in its shelf. Consequently, automatic alignment of the connector with the optical components becomes a critical factor in the connector design.

Figure 3:
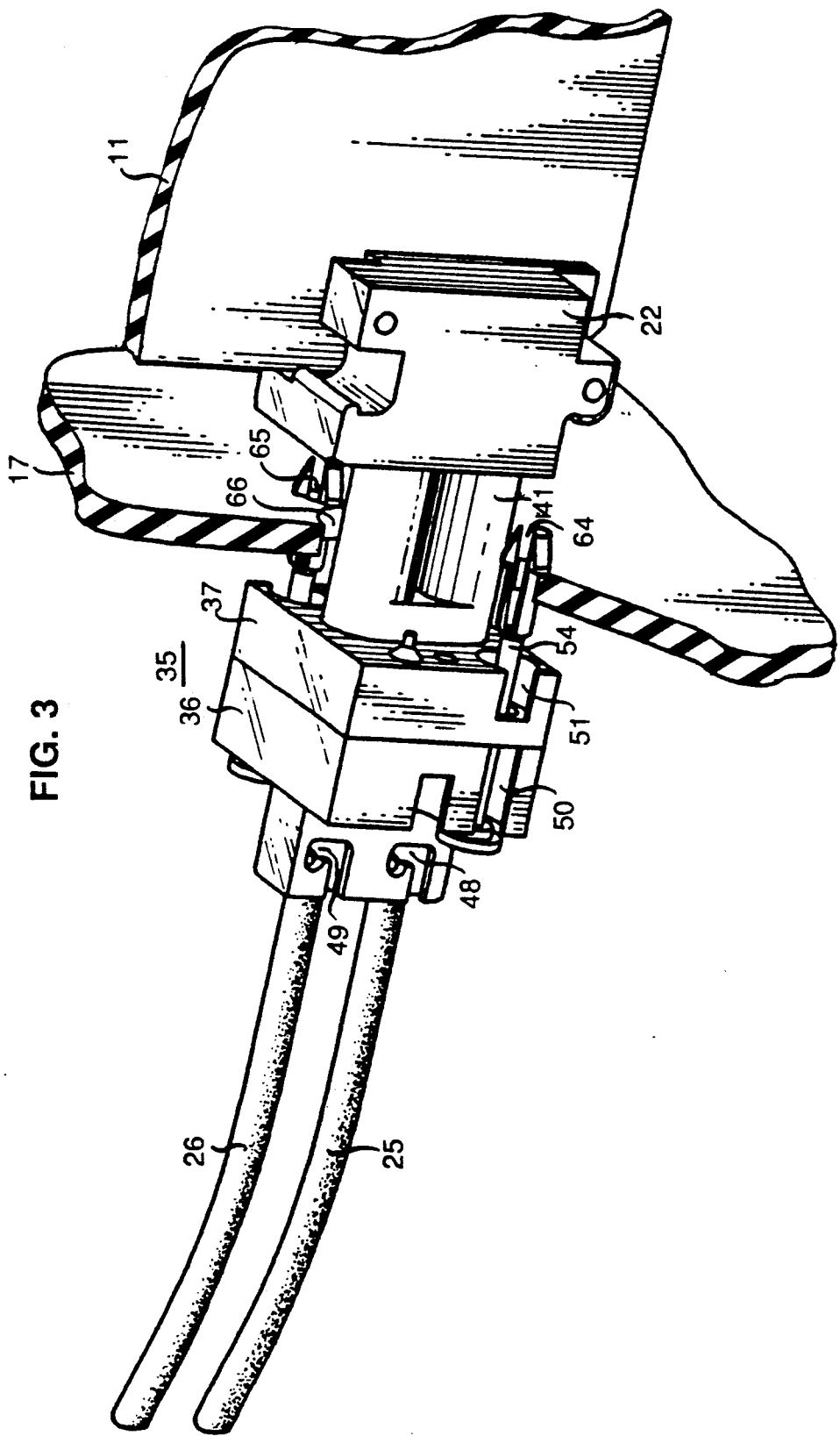
FIG. 3 is a perspective view of the assembled connector of FIG. 2.
Figure 4:
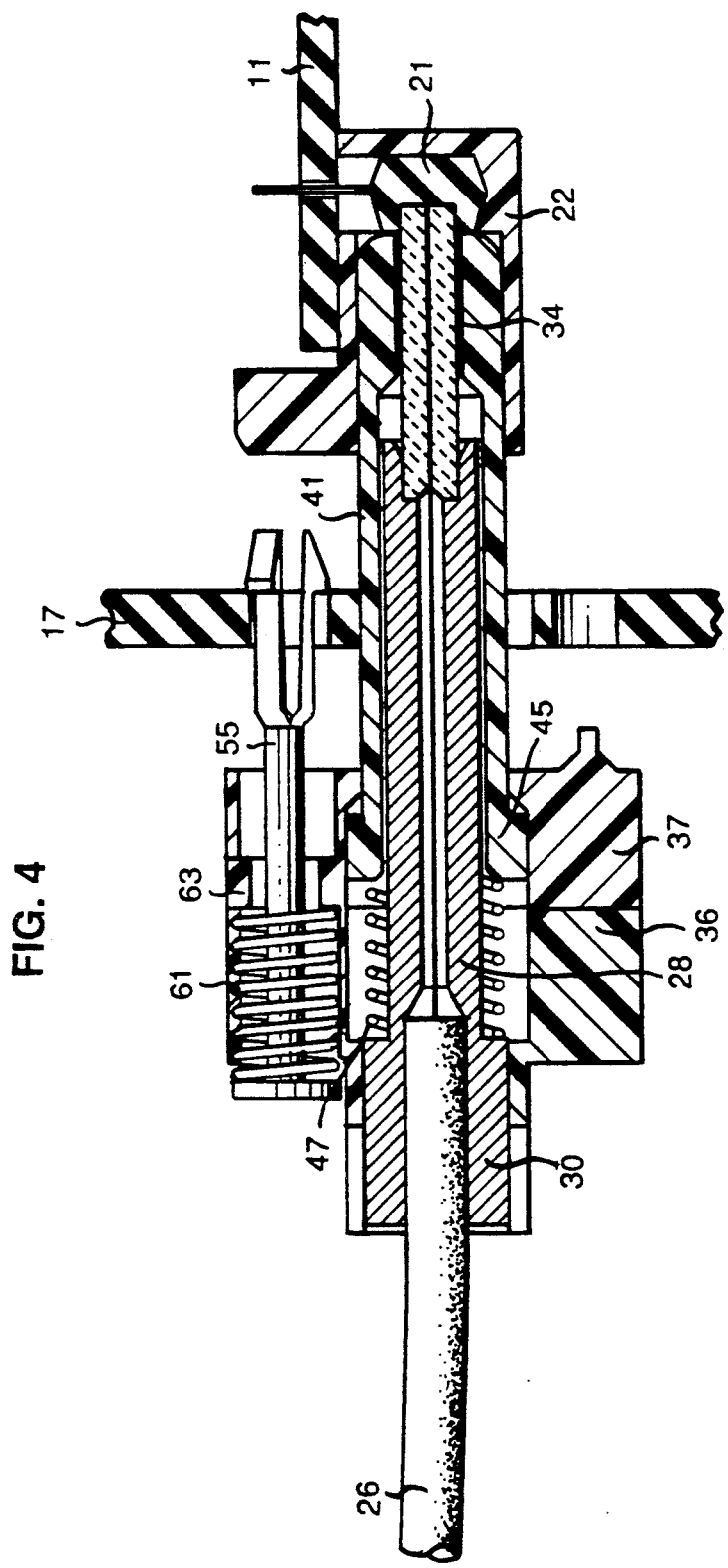
FIG. 4 is a cross-sectional view of the assembled connector of FIG. 3.

FIGS. 2-5 illustrate various views of a connector plug and socket in accordance with an embodiment of the invention. In this design, the optical components, 20 and 21, which are diodes in this example, are transfer overmolded by a transparent thermoset epoxy material such as Hysol MG-18 and mounted within a socket housing 22. The housing includes a pair of entrance ports (23 and 24 of FIG. 5) which will permit an optical fiber to communicate with each diode (74 and 75) as described in more detail below. As shown in FIGS. 3 and 4, the housing 22 is mounted to the edge of the circuit board, 11, by screws so that the leads of the diodes extend through conductive via holes in the board and thereby make appropriate electrical contact. While through-hole mounting is shown, it should be clear that surface-mount components could also be used in accordance with the invention.

In order to provide optical connection between the diodes 74 and 75 on the board and corresponding optical fibers 25 and 26, the fibers are inserted within the connector plug which is mounted to the backplane, 17, and which will now be described. The protective jackets of the fibers, 25 and 26, are stripped, and each fiber is inserted in its corresponding sleeve, 27 and 28. The sleeves are essentially cylindrical and include collars 29 and 30 at one end. Each collar includes a tab, 31 and 32. A ferrule, 33 and 34, is mounted within a bore at the end of each sleeve opposite the collar so that the bare fibers extend essentially to the end of the ferrules 33 and 34. The combination of sleeve, ferrule and fiber (e.g., 28, 34 and 26) is designated the "optical contact".

The optical contacts are inserted within a plug housing, 35, which includes two facing members 36 and 37 in intimate contact. The member 36 includes a pair of input ports, 38 and 39, to accommodate each contact and an output port 40 through which passes a barrel member 41. The facing member 37 includes a port 42 to permit passage of the barrel member 41 therethrough.

The barrel member, 41, includes a pair of cylindrical sleeves, 43 and 44, which receive the optical contacts so that the ferrules 33 and 34 project just beyond the ends of the sleeves (see FIG. 4). The barrel member also includes a collar 45 which permits the barrel member to slide within the ports 40 and 42 of housing 35, but which stops the forward motion of the barrel when the collar contacts the forward edge of port 42.

Spring members 46 and 47 are inserted in the housing between the respective sleeves, 27 and 28, and the collar 45 of the barrel member 41. When the sleeves 27 and 28 are inserted in the housing 35 so that their tabs 31 and 32 engage the notches 48 and 49 (see FIG. 3), the spring members 46 and 47 will accommodate the axial tolerance accumulation for the system.

The facing members 36 and 37 of housing 35 also include through-holes 50, 51 and 52, 53 which are diametrically positioned at the corners of the housing. Inserted through these holes are fasteners 54 and 55 which include snap-in tabs, 56 and 57, at their forward ends and flat bases 58 and 59 at the rearward ends. Springs 60 and 61 are inserted in the holes 50 and 52 of facing member 36 so that the springs are compressed between the bases, 58 and 59, of the fasteners, 54 and 55, and stop portions 62 and 63 of holes 51 and 53 of the other facing member 37.

The snap-in tabs, 56 and 57, of fasteners 54 and 55 are inserted into corresponding holes 64 and 65 of the backplane 17, while the barrel member 41 extends through another hole, 66, in the backplane. The fiber optic plug is now ready for connection with the socket 22 including the optical components on the circuit pack, as shown in FIGS. 3 and 4, when the circuit pack is slid into position on its shelf. It will be appreciated that in FIGS. 3 and 4 only the optical connection is shown, but the socket 22 is adjacent to the electrical connector on the edge of the circuit pack which makes contact with the pins in the backplane (see FIG. 1).

It will be appreciated that as the circuit pack is slid into position in its shelf, the sleeves 43 and 44 of the barrel member, 41, will be inserted into their respective entrance ports (23 and 24 of FIG. 5) in the socket 22. As a result of the springs 60 and 61 and fasteners 54 and 55 which mount the plug housing 35 to the backplane, the housing is floating and can align itself in the x and y directions to the socket 22 as the barrel member makes contact to the socket ports. When the circuit pack reaches its final position in the shelf, the ferrules 33 and 34 at the ends of the optical contacts will be inserted in the indentations (70 and 71 of FIG. 5) in the encapsulation surrounding the diodes 75 and 74, and rest against the shoulders 76 and 77 molded into the encapsulant. The ends of the fibers 25 and 26 will then be in alignment with spherical lenses 72 and 73 formed in the diode encapsulants, and optical interconnection is realized. This final x-y alignment results from the precise match of the ferrule's outside diameter with the precision molded inside diameter of the encapsulant. Z-axis, or axial, preload is provided by the springs 46 and 47 in contact with the slidable barrel member 41. Automatic alignment of the fibers with the optical components is, therefore, achieved as the circuit pack is positioned in its shelf.

Various modifications of the invention will become apparent to those skilled in the art. All such variations which basically rely on the teachings through which the invention has advanced the art are properly considered within the scope of the invention.

We claim:

1. An optical fiber connector comprising:
    a first sleeve for holding the fiber;
    a housing with an entrance port for receiving the sleeve and an exit port;
    a barrel member with a second sleeve for receiving the first sleeve, the barrel member being slidably mounted within the housing and extending through the exit port;
    spring means between a portion of the first sleeve and the barrel member for permitting axial movement of the first sleeve;
    a ferrule mounted at an end of the first sleeve and extending beyond the barrel member by a variable amount depending upon the compression of the spring; and
    means for movably mounting the housing to a backplane.

2. A device in accordance with claim 1 further comprising a socket including an optical component mounted at the edge of a circuit pack for receiving said ferrule.

3. A device in accordance with claim 2 wherein the optical component is surrounded by an encapsulant which includes an indentation for receiving said ferrule, the encapsulant including a front surface surrounding the indentation in order to provide a stop for the barrel member.

4. A device in accordance with claim 3 wherein the encapsulant further comprises a lens element molded in the encapsulant within the indentation.

5. The device according to claim 1 wherein the barrel member comprises a pair of second sleeves for receiving a pair of first sleeves, each holding an optical fiber.

6. The device according to claim 1 wherein the means for mounting the housing comprises a pair of fasteners, each including a snap-in tab at one end and a base at the other end, and further comprising spring means between the base and a portion of the housing.

* * * * *